No. 850,896. PATENTED APR. 23, 1907.
F. W. BEALS.
HEM FOR SEWED ARTICLES.
APPLICATION FILED JULY 28, 1906.

WITNESSES:
S. G. Stout.
W. A. Alexander.

INVENTOR
F. W. Beals.
BY
Howlie & Bryson
ATTORNEYS

UNITED STATES PATENT OFFICE.

FREDERICK W. BEALS, OF ST. LOUIS, MISSOURI, ASSIGNOR TO LEWIS BLIND STITCH MACHINE COMPANY, OF ST. LOUIS, MISSOURI, A CORPORATION OF MISSOURI.

HEM FOR SEWED ARTICLES.

No. 850,896.  Specification of Letters Patent.  Patented April 23, 1907.

Application filed July 28, 1906. Serial No. 328,189.

*To all whom it may concern:*

Be it known that I, FREDERICK W. BEALS, a citizen of the United States, residing at the city of St. Louis, State of Missouri, have invented a certain new and useful Hem for Sewed Articles, of which the following is such a full, clear, and exact description as will enable any one skilled in the art to which it appertains to make and use the same, reference being had to the accompanying drawings, forming part of this specification.

My invention relates to a hem which is more particularly adapted for use in connection with trousers-bottoms. It may, however, be used for coat-sleeves, skirt-bottoms, and many other articles of apparel.

Heretofore it has been customary in forming a hem in trousers-bottoms to secure the main layer of material and the turned-over portion together by means of rubber or other suitable cement. This is usually accomplished by placing a thin sheet of rubber between the two layers of material and softening the same by heat and pressure, so as to cause the two layers to adhere. In some cases the rubber alone is relied on to secure the two layers together. In other cases the free edge of the turned-over layer is secured to the main layer by a row of blind stitches and the rubber is placed only at the fold of the material. This method of securing the two layers together is expensive and unreliable, and in addition to this a permanent crease is formed at the fold of the material, so that it is not practicable to lengthen the trousers by letting out the hem.

The object of my invention is to produce a hem in which the above objections will be overcome.

In carrying out my invention I secured the two layers of material together adjacent to the fold by means of a row of blind stitches and also secured the free edge of the turned-over portion to the body of the material by some other means, preferably a second row of blind stitches.

Figure 1:
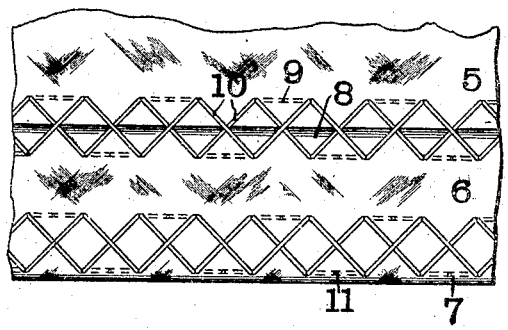
Figure 2:
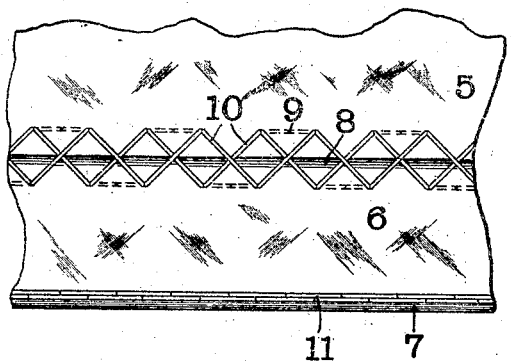
Figure 3:
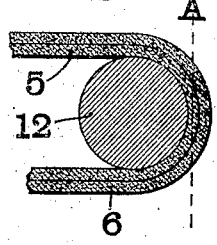

In the accompanying drawings, which illustrate a portion of a hem made in accordance with my invention, Figure 1 is a rear view showing one form of hem. Fig. 2 is a similar view showing a slightly-modified form, and Fig. 3 is a sectional view showing one manner of forming the hem in accordance with my invention.

Like marks of reference refer to similar parts in the several views of the drawings.

5 represents the main layer of the material. A portion 6 of the material is folded over upon the main layer 5 to form the hem, the fold being represented at 7. The free edge 8 of the turned-over portion 6 is secured to the main layer 5 in any suitable manner, preferably by means of two rows of blind stitches 9, connected by threads 10, crossing over the said free edge 8. Adjacent to the fold 7 I secure the two layers 5 and 6 together by means of a second row of blind stitches 11. This may be a double row, as shown in Fig. 1, connected by means of thread in the manner of an overseam or it may be a single row, as shown in Fig. 2. In either case the blind stitches pass through the folded-over layer 6 and into but not through the main layer 5. This is most readily accomplished, as illustrated in Fig. 3, by folding both layers around a suitable guide or finger 12 and passing the stitches through the layers, as indicated by the dotted line "A" in said figure.

The hem made in accordance with my invention is less expensive than the hem heretofore in use for trousers-bottoms, and at the same time it is more reliable and does not form a permanent crease at the fold 7, and consequently the trousers may be lengthened by letting out the hem.

Having fully described my invention, what I claim as new, and desire to secure by Letters Patent of the United States, is—

1. In a hem, a main layer of textile or similar material, and a superimposed layer formed of a folded portion of said main layer, means for securing the free edge of said folded portion to said main layer, and a row of blind stitches securing said layers together adjacent to the fold.

2. In a hem, a main layer of textile or similar material, and a superimposed layer formed of a folded portion of said main layer, a row of blind stitches securing the free edge of said folded portion to said main layer, and a second row of blind stitches securing said layers together adjacent to the fold.

3. In a hem, a main layer of textile or similar material, and a superimposed layer formed of a folded portion of said main layer, a double row of blind stitches crossing the free edge of said folded portion and securing same to said main layer, and a second row of blind stitches securing said layers together adjacent to the fold.

In testimony whereof I have hereunto set my hand and affixed my seal in the presence of the two subscribing witnesses.

F. W. BEALS. [L. S.]

Witnesses:
CLAUDE ERDMAN,
J. P. PETERSON.